United States Patent Office 3,770,720
Patented Nov. 6, 1973

3,770,720
PROCESS FOR THE EXTRACTION OF ALKALI SALTS OF DEOXYRIBONUCLEIC ACID FROM ANIMAL ORGANS
Adriano Butti, Como, Giuseppe Prino, Milan, and Gianfranco Bertellini, Maslianico, Italy, assignors to Crinos Industria Farmacobiologica S.p.A., Villa Guardia, Italy
No Drawing. Filed Nov. 2, 1971, Ser. No. 194,919
Claims priority, application Italy, Nov. 3, 1970, 31,308/70
Int. Cl. C07d 51/50
U.S. Cl. 260—211.5 R      3 Claims

ABSTRACT OF THE DISCLOSURE

A process for extracting alkali salts of deoxyribonucleic acid (DNA) from animal organs wherein the comminuted animal organ, after a preliminary treatment, is reacted with an aqueous solution of a zinc salt forming the zinc salt of DNA which precipitates, the resulting precipitate is then separated and converted into the corresponding alkali salt.

DISCLOSURE OF THE INVENTION

The present invention relates to the extraction of nucleic acids from animal organs and more particularly to a process for extracting alkali salts of deoxyribonucleic acid (DNA).

Several processes for the extraction of nucleic acids from animal and vegetable organs and tissues are presently known. All processes described up to the present nevertheless show the characteristic of being laboratory processes difficult to be used for production on an industrial scale. It is therefore an object of the present invention to provide an industrial process for the extraction of deoxyribonucleic acid from easily available animal organs, such as lungs, placenta, intestine, duodenum, pancreas and so on, which comprises steps easily feasible on an industrial scale.

The process according to the present invention is substantially based on the separation of the deoxyribonucleic acid from the other substances which form animal tissues and organs (proteins, fats, polysaccharides etc.) through the formation of its zinc salt which is then converted into the alkali salt.

Besides being of relatively low cost, zinc offers the substantial advantage that its salts with the substances which accompany the DNA in animal organs have a remarkably higher hydrosolubility while its salts with DNA are practically insoluble in $H_2O$.

The preparation of the zinc salt of deoxyribonucleic acid according to the present invention is carried out by treatment of the raw extractive material with the aqueous solution of a hydrosoluble zinc salt. For this purpose several organic and inorganic zinc salts are suitable, for example zinc chloride, zinc acetate etc. may be employed.

The animal organs, from which the deoxyribonucleic acid is to be extracted, according to the process of the present invention are preferably submitted to a preliminary treatment for quickly eliminating the mass of proteic scoriae. Such a preliminary treatment may be carried out according to known methods, for example by means of alkaline extraction, proteolysis and so on. Before treating the starting material with zinc salt it is preferable, but not necessary for the purpose of the present invention, to treat the said material with a basic complex-forming agent in order to definitively eliminate any trace of non-acid and more particularly proteic substances.

The complex-forming agents preferably used for this purpose are quaternary bases, such as benzyldimethyl{2-[2-(p. 1,1,3,3 - tetramethyl-butyl phenoxy)ethoxy]ethyl} ammonium chloride commonly known as benzethonium chloride.

The treatment with the basic complex-forming agent is preferably carried out in aqueous solution buffered with the system sodium acetate/acetic acid.

The resulting complex is than decomposed by treatment with sodium chloride in aqueous solution under heating and the so obtained solution is then treated with a zinc salt for precipitating the zinc salt of DNA.

The zinc salt of deoxyribonucleic acid is then easily transformed into the corresponding sodium salt or potassium salt by means of treatment with sodium or potassium carbonate. The carbonate compound forms an insoluble compound with zinc. For this treatment sodium carbonate is the preferred reactant. The sodium salt of deoxyribonucleic acid further can be purified in a known way with a treatment of its aqueous solutions with a suitable cation exchange resin followed by neutralization with alkali and subsequent precipitation of the purified salt.

The sodium salt of deoxyribonucleic acid prepared as above described is an ivory colored powder which have the following main analytical characteristics:

| | Percent |
|---|---|
| Phosphorus | 8.5 |
| Na | 9.0 |
| N | 14 |
| S | Absent |
| Deoxyribose | 23.2 |
| Total bases | 34 |
| Guanine | 9.4 |
| Thymine | 9.4 |
| Adenine | 9.2 |
| Citosine | 6 |
| Uracil | Absent |

As it appears from the above analytical characteristics and more particularly from the complete absence of uracil, the final products of the process according to the present invention have a composition identical to that of the sodium salt of deoxyribonucleic acid.

EXAMPLE 1

100 parts by weight of washed and degreased swine or bovine duodenum are ground in a meat chopper provided with a plate having holes of 1.1 mm. diameter, and dispersed with the aid of a homogenizating apparatus in 100 parts of water; to the obtained suspension 2 N sodium hydroxide is then added until the pH has reached the value of 11 and finally it is rapidly heated up to 90° C. under stirring. The mass is maintained at this temperature for one hour and the pH is decreased to 5.5–5.8 by adding hydrochloric acid 2 N. After cooling at 60–65° C., 0.2 part by weight of papain is added to the mass, which is then kept for 16 hours at a temperature of 60–65° C. under stirring. After addition of 5 parts by weight of an agent coadjuvating the filtration (Celite FN 20 or the like) the mass is filtered in a filter-press and washed with hot water. The filtrate is concentrated under reduced pressure up to 100 parts by volume and then treated with 100–120 parts by volume of acetone.

The precipitate is washed by decantation with aqueous acetone, dried under vacuum and ground. Yield: gr. 0.3–0.4 in weight.

100 parts by weight of the powder obtained as above described are dissolved in 9,500 parts of water at 40° C. to the solution are added under stirring first 500 parts by volume of sodium hydroxide 2 N, then 2000 parts by volume of a 10% benzethonium chloride solution and finally 100 parts by volume of acetic acid 3 N. The precipitate is separated by decantation and then repeatedly washed with water in centrifuge.

One part by weight of the moist precipitate is dispersed under stirring in 5 parts by volume of a 2 N solution of sodium chloride at the temperature of 40° C.; 7.5 parts by volume of acetone are added and the precipitate is filtered, then washed with acetone, finally dried under vacuum and ground.

One part by weight of the obtained powder is dissolved in 10 parts by volume of water at normal temperature and to this solution are added under vigorous stirring 10 parts by volume of a 3 M zinc chloride solution. The precipitate is separated by decantation and centrifugation and repeatedly washed with water. The washed precipitate is then dried under vacuum and ground; 0.75 part by weight of anhydrous zinc salt is obtained.

One part by weight of the obtained zinc salt is suspended in 10 parts by volume of water at a temperature of 60° C. and then 10 parts by volume of a 1 M sodium carbonate solution previously heated to 60° C. are added to the suspension with stirring which is allowed to stand for 12 hours at 10° C. and then centrifugated for removing the precipitated zinc carbonate. The liquid is again filtered up to complete clarification and subsequently acidified to pH 5 with acetic acid 3 N at a temperature of 60° C. and under stirring. At the end of the development of carbon dioxide, the solution is neutralized with sodium hydroxide 2 N and the solute is precipitated by adding 30 parts by volume of acetone. After being allowed to rest for 3–5 hours the precipitate is separated by decantation, washed with 2:1 acetone:water mixture, dehydrated with dry acetone, dried under vacuum and ground. One part by weight of the obtained powder is dissolved in 40 parts by volume of deionized water and the solution is percolated through a column of an ion exchanging resin of the cation exchange type such as Amberlite IR 120 or the like.

The column is successively washed with 20 volumes of deionized water. The collected liquids are mixed together, neutralized with sodium hydroxide 2 N, treated with 0.005 part by weight of sodium iodide and added with 150 parts by volume of acetone.

The precipitate is separated by decantation, washed with 3:1 aqueous acetone, then dehydrated with anhydrous acetone, finally dried under vacuum and ground.

About 0.8 part by weight of the product with the following analytical characteristics are obtained:

| | | |
|---|---|---|
| Viscosity | centip__ | 1.7792 |
| P | percent__ | 8.65 |
| N | do____ | 14.47 |
| Na | do____ | 8.95 |
| S | | Absent |
| Deoxyribose | percent__ | 23.2 |
| Total bases | do____ | 34 |
| Guanine | do____ | 9.4 |
| Thymine | do____ | 9.4 |
| Adenine | do____ | 9.2 |
| Citosine | do____ | 6 |
| Uracil | | Absent |

The viscosity of the substances described in this and in the following examples has been measured in 0.5 molar solution of sodium chloride in which the product has been dissolved in the ratio of 1%. The tests have been carried out at 20° C. in a Höppler viscometer (internal diameter of the tube mm. 15.950; falling distance mm. 100) using the sphere N. 1 (0 mm. 15.805; weight gr. 4.9848). Under these conditions the 0.5 molar solution of sodium chloride gives a falling time of the sphere of 70.8″ corresponding to 0.9841 centipoise.

EXAMPLE 2

100 parts in weight of a well preserved and degreased swine or bovine placenta are submitted to grinding, alkaline hydrolysis and proteolysis as described in Example 1. In this way 0.8–1 part by weight of a dry and ground material is collected.

One part of the obtained powder is dissolved in 16 parts by weight of water and treated with one part by volume of a 40% zinc chloride solution in water. The resulting precipitate is separated by decantation and centrifugation and repeatedly washed with water.

One part by weight of this substance is suspended in 10 parts by weight of water. 0.2 part by volume of chloridric acid $d=1.19$ is added to the suspension which is then stirred at room temperature for 15′. A gummy precipitate is separated, suspended in 8 parts by weight of water and then treated under stirring with 3 parts by volume of a 10% aqueous solution of sodium carbonate. The mass is allowed to rest for 12 hours, then the zinc carbonate is removed, and the filtrate, acidified to pH 5.5 with acetic acid, is heated to 60° C. under stirring until the development of carbon dioxide is over. The solution is neutralized with 2 N sodium hydroxide and then admixed with 15 parts by volume of acetone. After a rest of 3–5 hours the precipitate is separated by decantation, washed with a 2:1 acetone/water mixture, dehydrated with dry acetone, dried under vacuum and finally ground.

The yield is of about 0.1 part by weight of a substance having the following analytical characteristics:

| | | |
|---|---|---|
| Viscosity | | Indeterminable |
| P | percent__ | 7.9 |
| N | do____ | 14.45 |
| Na | | 8.55 |
| S | | Absent |
| Total bases | percent__ | 32.5 |
| Deoxyribose | do____ | 23.5 |

What is claimed is:

1. In a process for the extraction of alkali salts of deoxyribonucleic acid from previously degreased and deproteinized comminuted animal organs without degradation of the deoxyribonucleic acid, the improvement wherein said extraction comprises:

precipitating zinc salt of deoxyribonucleic acid, wherein said precipitating step comprises reacting the pretreated comminuted animal organ with an aqueous solution of a water soluble zinc salt which is capable of reacting with the comminuted animal organ to form a precipitate comprising the zinc salt of deoxyribonucleic acid, and wherein said reacting step takes place under conditions at which said precipitate forms;

separating said zinc salt of deoxyribonucleic acid precipitate;

converting the zinc salt of deoxyribonucleic acid into the corresponding alkali salt, wherein said converting step comprises reacting the zinc salt of deoxyribonucleic acid with a water soluble alkali salt capable of reacting with the zinc salt of deoxyribonucleic acid to form the corresponding alkali salt of deoxyribonucleic acid and wherein said step of reacting the zinc salt takes place under conditions at which said alkali salt of deoxyribonucleic acid is formed; and recovering said alkali salt of deoxyribonucleic acid.

2. A process in accordance with claim 1, further including, prior to said precipitating step, treating the pretreated comminuted animal organ with a basic complex-forming agent which forms a slightly soluble complex with the deoxyribonucleic acid, said complex being then separated and decomposed before its reaction with the aqueous solution of a zinc salt.

3. A process in accordance with claim 2, wherein said complex forming agent is benzethonium chloride, and the complex is formed in a buffered aqueous solution.

References Cited
UNITED STATES PATENTS

| | | | |
|---|---|---|---|
| 2,379,912 | 7/1945 | Laufer | 260—211.5 R |
| 2,698,844 | 1/1955 | Dimroth et al. | 260—211.5 R |
| 3,457,254 | 7/1969 | Yano et al. | 260—211.5 R |
| 3,509,128 | 4/1970 | Fujimoto et al. | 260—211.5 R |
| 3,700,654 | 10/1972 | Brusca | 260—211.5 R |

JOHNNIE R. BROWN, Primary Examiner